United States Patent
Aigner et al.

(10) Patent No.: US 9,964,014 B2
(45) Date of Patent: May 8, 2018

(54) METHOD OF OPERATING A FLUID CONTAINER ARRANGEMENT, AND FLUID CONTAINER ARRANGEMENT

(71) Applicant: Audi AG, Ingolstadt (DE)

(72) Inventors: Konrad Aigner, Neustadt-Hienheim (DE); Christoph Reischl, München (DE)

(73) Assignee: AUDI AG, Ingolstadt (DE)

(*) Notice: Subject to any disclaimer, the term of this patent is extended or adjusted under 35 U.S.C. 154(b) by 47 days.

(21) Appl. No.: 15/337,070

(22) Filed: Oct. 28, 2016

(65) Prior Publication Data
US 2017/0122163 A1 May 4, 2017

(30) Foreign Application Priority Data
Oct. 28, 2015 (DE) .......................... 10 2015 013 877

(51) Int. Cl.
*F01N 3/26* (2006.01)
*F01N 3/20* (2006.01)
*G01F 23/26* (2006.01)
*F01N 3/28* (2006.01)

(52) U.S. Cl.
CPC .......... *F01N 3/206* (2013.01); *F01N 3/2896* (2013.01); *G01F 23/26* (2013.01); *F01N 2610/02* (2013.01); *F01N 2610/105* (2013.01); *F01N 2900/1814* (2013.01)

(58) Field of Classification Search
CPC ......... F01N 2610/10; F01N 2610/1406; F01N 2610/148; F01N 2610/1486; F01N 2900/1814
See application file for complete search history.

(56) References Cited

U.S. PATENT DOCUMENTS

| 8,448,426 | B2 | 5/2013 | Peucat et al. |
| 8,756,919 | B2 | 6/2014 | Hodgson et al. |
| 2010/0236243 | A1 | 9/2010 | Lolas et al. |
| 2011/0107812 | A1* | 5/2011 | Kasahara ............... F01N 3/2066 73/1.02 |
| 2011/0210836 | A1 | 9/2011 | Baumeister |
| 2013/0255234 | A1 | 10/2013 | Bauer et al. |
| 2013/0318950 | A1 | 12/2013 | Gottwald |
| 2014/0166636 | A1 | 6/2014 | Naydenov et al. |
| 2016/0003120 | A1* | 1/2016 | Tsuchiya ............... F01N 3/2066 60/310 |
| 2017/0059386 | A1* | 3/2017 | Munoz .................. G01F 23/263 |

FOREIGN PATENT DOCUMENTS

| DE | 102007001175 A1 * | 7/2008 |
| DE | 102008056860 | 5/2010 |
| DE | 102009001736 | 9/2010 |

(Continued)

*Primary Examiner* — Jonathan Matthias
(74) *Attorney, Agent, or Firm* — Henry M. Feiereisen LLC

(57) ABSTRACT

In a method of operating a fluid container arrangement, a fill level determination device, used to determine a fill level in a fluid container, checks, when desiring to withdraw fluid from the fluid container, for the presence of a cavity in a fluid contained in a fluid container, and, when the presence of the cavity is affirmative, detects a change in volume of the cavity. The heat output of the heating device is raised, when the volume of the cavity has increased, and the heat output of the heating device is lowered, when the volume of the cavity has decreased.

18 Claims, 2 Drawing Sheets

(56) References Cited

FOREIGN PATENT DOCUMENTS

| DE | 102009054735 | 6/2011 |
| DE | 102010011151 | 9/2011 |
| DE | 102011108907 | 2/2012 |
| DE | 102010062333 | 6/2012 |
| DE | 102011002902 | 7/2012 |

* cited by examiner

METHOD OF OPERATING A FLUID CONTAINER ARRANGEMENT, AND FLUID CONTAINER ARRANGEMENT

CROSS-REFERENCES TO RELATED APPLICATIONS

This application claims the priority of German Patent Application, Serial No. 10 2015 013 877.4, filed Oct. 28, 2015, pursuant to 35 U.S.C. 119(a)-(d), the disclosure of which is incorporated herein by reference in its entirety as if fully set forth herein.

BACKGROUND OF THE INVENTION

The present invention relates to a method of operating a fluid container arrangement, and to a fluid container arrangement.

The following discussion of related art is provided to assist the reader in understanding the advantages of the invention, and is not to be construed as an admission that this related art is prior art to this invention.

A fluid container arrangement has a fluid container with an interior space in which fluid is present at a certain fill level. The fill level relates hereby, for example, to the filling height of the fluid in the fluid container and/or the fluid volume occupied by the fluid in the fluid container. The fill level in the fluid container can be determined by a fill level determination device which includes for example at least one sensor.

Fluid in the fluid container can assume various physical states depending on the prevailing ambient conditions. For example, the fluid may freeze. To still be able to withdraw fluid from the fluid container, a heating device is provided so as to heat the fluid container and the contained fluid in order to thaw frozen fluid for subsequent withdrawal. The heating device can be operated at full capacity, when an ambient temperature drops below the freezing point of the fluid.

When thawing frozen fluid with the assistance of the heating device, a pocket of liquid fluid is formed which is fully trapped or at least trapped in part by surrounding frozen fluid. When now withdrawing fluid from the fluid container, especially from the fluid pocket, a cavity forms in the fluid pocket so that the fluid pocket then contains both liquid fluid and an air void. This is disadvantageous because air formed in the cavity represents a thermal insulator which complicates or even completely prevents melting of frozen fluid adjacent to the cavity.

It would therefore be desirable and advantageous to provide an improved method of operating a fluid container arrangement to obviate prior art shortcomings and to enable reliable withdrawal of fluid while yet keeping energy consumption of a heating device to a minimum.

SUMMARY OF THE INVENTION

According to one aspect of the present invention, a method of operating a fluid container arrangement includes checking, when desiring to withdraw fluid from the fluid container, for the presence of a cavity in a fluid contained in a fluid container by a fill level determination device configured for determining an actual fill level of the fluid in the fluid container, and, when the presence of the cavity is affirmative, detecting a change in volume of the cavity, and controlling a heat output of a heating device for heating the fluid container in response to the detected change in volume of the cavity.

Checking for the presence of a cavity can basically take place continuously. Of course, checking may also be executed only when there is an expectation of frozen fluid being present in the fluid container, for example when the ambient temperature drops below a temperature threshold value, e.g. the freezing point of the fluid. The checking operation may be executed at the beginning of fluid withdrawal or during withdrawal of fluid. Withdrawal of fluid may, for example, be implemented by using a transport device which carries fluid via an appropriate suction connection away from the fluid container for transport to a fluid consumer for example. The fluid may involve a reducing agent so that the fluid consumer may be reducing agent introduction device. In this case, the fluid container may be designated as a reducing agent tank.

According to another advantageous feature of the present invention, the heat output of the heating device can be raised, when detecting that the volume of the cavity has increased. Conversely, when detecting that the volume of the cavity has decreased, the heat output of the heating device can be lowered. An increase in the cavity can, for example, be discerned, when the cavity has a first volume at a first point in time and a second volume in a second point in time following the first point in time, with the second volume being greater than the first volume. The presence of a decrease of the cavity is indicated, when the second volume is smaller than the first volume.

The term "cavity" is to be understood as an air void in the fluid. For example, the air void may be fully, or at least in part, enclosed by frozen fluid. In accordance with the present invention, the emergence of a cavity or at least an enlargement thereof should be counteracted with the assistance of the heating device while at the same time keeping energy demand of the heating device to a minimum. This objective is realized by the present invention by adapting the heat output of the heating device to the size or volume of the cavity. As a cavity forms only as a consequence of withdrawing fluid from the fluid container, the present invention proposes to check the presence of a cavity or any enlargement or decrease in the cavity during withdrawal of fluid and to then adjust the heat output of the heating device accordingly, i.e. to raise it or to lower it.

Thus, provision is made for an adjustment of the heat output of the heating device to the currently prevailing conditions in the fluid container, i.e. the heat output is adjusted to the size or volume of the cavity and can be variably adjusted over time. The heat output is thus a function of the volume of the cavity. In addition, or as an alternative, the heat output may, of course, also be selected in response to a further variable, for example as a function of a gradient of the volume of the cavity over time. In other words, the heat output of the heating device is chosen greater the greater the cavity and/or the greater the volume gradient, i.e. the faster the increase of the cavity. Conversely, the heat output is reduced or lowered more rapidly as the cavity becomes smaller and/or the volume gradient becomes smaller. The gradient of the volume of the cavity or the volume gradient is positive, when the cavity increases in volume and negative, when the cavity decreases in volume.

According to another advantageous feature of the present invention, the fill level determination device can be configured to operate capacitively. For this purpose, the fill level determination device includes, for example, a first electrode and at least a second electrode. Of course, more than one first electrode and more than one second electrode may be provided, and the provision of any number of further electrodes may also be contemplated, which may be constructed analog to the first and second electrodes. The first and second electrodes can be arranged in an interior space of the fluid container, suitably in confronting relationship.

When the fill level determination device operates capacitively, the capacity and/or change in capacity is determined between the first electrode and the second electrode. The capacity changes due to the dielectric which is disposed between the first and second electrodes and is present in the fluid container. When the fill level in the fluid container is high enough for the first electrode and/or the second electrode to be situated in the region of the fluid, the dielectric between the first and second electrodes is formed, at least in part, suitably entirely, by the fluid.

The electrodes can be arranged in the interior space of the fluid container in confronting relationship, for example, on an inner wall of the fluid container that bounds the interior space, or can be integrated in the inner wall, i.e. on the side defining the interior space or even in the interior space itself. Of course, it is also possible to place the electrodes on the side of the inner wall distal to the interior space, or in the inner wall outside of the interior space.

Provision may be made for the first and second electrodes to be arranged such that—at least as viewed in cross section—a mid-plane of the first electrode and a mid-plane of the second electrode are angled in relation to each other. The center of gravity of the electrodes lies hereby on the mid-planes, respectively. Advantageously, the mid-plane extends in two directions extending in perpendicular relation, in which the respective electrode has the greater dimensions, and is received in midsection of the electrode in relation to a third direction which extends perpendicular to the two afore-mentioned directions. Of course, it is also possible that each of the mid-planes is defined by a planar measuring surface of the respective electrode in facing relation to the interior space of the fluid container. This mid-plane is normally arranged parallel and offset relative to the afore-mentioned mid-plane, i.e. offset in direction of the interior space.

Provision may now be made for the first mid-plane to be angled in relation to the second mid-plane, i.e. defining an angle of greater than 0° and smaller than 180°. The angle between the mid-planes may be at least 60° and maximal 120°, or at least 70° and maximal 110°, or at least 80° and maximal 100°, or at least 85° and maximal 95°, or precisely 90°. As an alternative, the angle may, of course, also be between a measuring surface of the first electrode and a measuring surface of the second electrode. In other words, the first and second electrodes are arranged such that a measuring surface of the first electrode and a measuring surface of the second electrode are angled relative to each other. The description relating to the mid-plane is applicable here in a same way.

The first electrode and/or the second electrode may also be curved in at least one direction, in particular in the direction of its greatest extent. The curvature may hereby be provided over the entire course in this direction so as to assume a circular shape for example. In this case, each of the mid-planes is defined in the cross section and extends thus in the cross section in tangential relation to the respective electrode.

For example, the first and second electrodes can be arranged adjacent to each other. Advantageously, the two electrodes may directly abut one another in at least one direction. In any event, there is no further electrode between the first and second electrodes, even when the latter are spaced from one another. As a result of their angled disposition relative to each other, the immediately adjacent electrodes may also oppose one another, so that the measuring surface of the first electrode lies on the side of the first electrode facing the second electrode, and vice versa.

Advantageously, the first and second electrodes can be arranged in the shape of a V, as viewed in cross section, with the first and second electrodes arranged in a common recess, which is formed on an inner wall of the fluid container. The V shape or V arrangement is defined by two planes or straight lines that intersect at a specific angle. The angle is hereby greater than 0° and can be maximal 120°, maximal 110°, maximal 100°, maximal 90°, maximal 80°, maximal 70°, or maximal 60°. Of course, the angle may also be smaller.

The first and second electrodes are arranged in confronting relation or with confronting measuring surfaces in the V-shaped configuration, with the first electrode located on a first one of the planes or straight lines, and with the second electrode located on a second one of the planes or straight lines. For example, the common recess can have a V shape. The recess or depression is formed on the inner wall of the fluid container, with an apex of the recess situated on a side facing away from the interior space. Thus, the recess opens in the direction of the interior space. As a result of this configuration, the fluid is able to migrate out of the recess, when the fluid volume increases, e.g. as a result of a change in the physical state, without a force or pressure being exerted on the electrodes that could lead to damage.

According to another advantageous feature of the present invention, the fill level determination device can include a plurality of sensors to ascertain a permittivity profile in the fluid container, with the permittivity profile assigning permittivity values to subvolumes of the fluid container. The sensors may be formed, for example, by the afore-described first and second electrodes, with at least one first electrode and/or at least one second electrode being associated to each sensor. The sensor are arranged such as to be capable to ascertain the permittivity profile in the fluid container. For this purpose, the sensors can be arranged to one another in geodetically vertical direction, i.e. the sensors together span at least one part, advantageously a major part, of the extent of the fluid container or the interior space thereof in vertical direction. As described above, the fill level determination device operates advantageously in a capacitively manner. Accordingly, the fill level determination device can be used to ascertain the permittivity profile in the fluid container. The permittivity relates to a measure of resistance that electric fields, generated by the fill level determination device, encounter in the interior space of the fluid. The permittivity profile contains a multitude of permittivity values, with each permittivity value being assigned to a corresponding one of the plurality of subvolumes of the fluid container. The subvolumes vary from one another and advantageously directly adjoin one another. The subvolumes are arranged above one another in geodetically vertical direction and extend in particular across the entire cross section of the fluid container or the interior space thereof.

According to another advantageous feature of the present invention, the presence of frozen fluid in one of the subvolumes can be detected, when the corresponding permittivity value exceeds a first threshold value. Thus, the permittivity value for each subvolume, assigned thereto, is checked. When the permittivity value exceeds the first threshold value, it can be inferred that the fluid in the subvolume is frozen at least in part.

According to another advantageous feature of the present invention, the presence of liquid fluid in one of the subvolumes can be detected, when the corresponding permittivity value corresponds at the most to the first threshold value and exceeds a second threshold value. In the same way, as described above, the permittivity value assigned to the subvolume is checked. When the permittivity value exceeds the second threshold value, but is smaller than or equal to the first threshold value, the presence of liquid fluid in the subvolume can be inferred. Normally, the permittivity value for liquid fluid is greater than the permittivity value for frozen fluid. This is the basis for the analysis as to whether frozen or liquid fluid is present in the subvolume.

According to another advantageous feature of the present invention, the presence of the cavity in one of the subvolumes can be detected, when the corresponding permittivity value corresponds at the most to the second threshold value. The cavity if formed by air. Air typically has a permittivity that is smaller than the permittivity of the fluid, regardless of the physical state of the fluid, i.e. whether it is frozen or liquid. Accordingly, the presence of the cavity in the subvolume can be inferred, when the permittivity value, assigned to the subvolume, is smaller or equal to the second threshold value.

According to another advantageous feature of the present invention, an actual fill level of the fluid container can be determined from the permittivity profile in response to a distance of an uppermost one of the subvolumes, in which the presence of fluid has been detected, from a bottom of the fluid container. The permittivity profile thus enables determination of the subvolume that contains fluid and is the uppermost subvolume in geodetically vertical direction. The physical state of the fluid is hereby irrelevant. Thus, the uppermost subvolume is used that has a permittivity value greater than the first and second threshold values. The actual fill level can be inferred from the distance of this subvolume from the bottom of the fluid container. For example, the fluid volume in the fluid container can be determined by adding the subvolumes from the bottom up to the uppermost subvolume in which the presence of fluid has been detected.

According to another advantageous feature of the present invention, the presence of an increase of the cavity can be detected, when the actual fill level is constant and the permittivity value is decreased in one of the subvolumes which is below the uppermost subvolume in which fluid is present. When the actual fill level remains constant, despite withdrawal of fluid, the presence of an increase of the cavity can be inferred. When the permittivity continues to decrease in the subvolume below the uppermost subvolume, i.e. when the permittivity in particular in this subvolume drops below the second threshold value, an increase of the cavity can be inferred.

According to another advantageous feature of the present invention, the heating device can include a plurality of heating elements which can be activated as a function of the permittivity profile. The heating elements can, for example, be arranged in the fluid container above one another in geodetically vertical direction. Each heating element can, for example, be associated to one or more of the afore-described subvolumes. Currently preferred is the association of a separate heating element for each subvolume. The heat output of the one heating element is increased that is associated to the one of the subvolumes, in particular the subvolume in which the presence of frozen fluid has been detected.

In addition, or as an alternative, provision may be made to reduce the heat output of one of the heating elements, with this heating element being associated to one of the subvolumes, in which the presence of the cavity has been detected. Advantageously, the sum of the heat outputs of all heating elements is elevated, when detecting that the cavity has increased. In addition, or as an alternative, the sum of the heat outputs of all heating elements can be lowered, when detecting that the cavity has become smaller. In this way, it is possible to selectively activate those heating elements with elevated heat output for effectively enable a melting of frozen fluid. Melting may hereby take place directly, when the respective heating element is present in the frozen fluid, or also indirectly, when the heating element is present in the liquid fluid adjacent to the frozen fluid. At the same time, operation of the heating element or heating elements in the cavity should be avoided.

According to another aspect of the present invention, a fluid container arrangement includes a fluid container for receiving a fluid, a fill level determination device configured to determine an actual fill level in the fluid container, and a heating device for heating the fluid container, the fill level determination device being configured such when desiring to withdraw fluid from the fluid container, the fill level determination device checks the presence of a cavity in the fluid, and a heat output of the heating device is controlled in response to a change in volume of the cavity.

According to another advantageous feature of the present invention, the heat output of the heating device can be raised, when the volume of the cavity increases, or the heat output of the heating device can be lowered, when the volume of the cavity drops.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
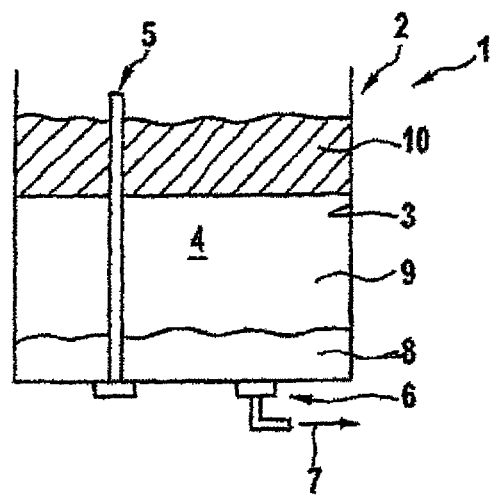
FIG. 1 is a sectional view of one embodiment of a fluid container arrangement according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of one embodiment of a fluid container arrangement according to the present invention, generally designated by reference numeral 1. The fluid container arrangement 1 includes a fluid container 2 having an inner wall 3 to define an interior space 4. A fluid, e.g. a reducing agent such as urea solution, can be temporarily stored in the interior space 4 of the fluid container 2. The fluid container 2 can thus be designated as reducing agent tank. The interior space 4 may have, for example a round shape or a rectangular shape, although any suitable configuration of the interior space 4 is, of course, also conceivable within the scope of the present invention.

The fluid container arrangement 1 includes in addition to the fluid container 2 a fill level determination device 5 which includes, for example, several electrodes, which are not shown for the sake of simplicity. Connected to the bottom of the fluid container 2 is a discharge fitting 6 by which fluid can be withdrawn from the fluid container 2, as indicated by arrow 7. The electrodes of the fill level determination device 5 may, for example, be configured in such a way as to allow a determination between the electrodes of a capacity in the form of a capacity measuring value. A fill level of fluid in the interior space 4 of the fluid container 2 can then be ascertained on the basis of the capacity measuring value.

The fluid container arrangement 1 further includes a heating device, which is not shown in detail and is used to heat the fluid container 2 and the fluid contained in the fluid container 2. The fluid may assume different physical states in dependence on the temperature thereof, as impacted in particular by an ambient temperature. By way of example, FIG. 1 depicts a situation in which the fluid container 2 contains liquid fluid 8, a cavity 9, and frozen fluid 10. Such a scenario may be encountered, when fluid in the fluid container 2 is frozen in the region of the discharge fitting 6. To still enable withdrawal of fluid, the heating device is activated to heat this region and thereby progressively thaw the frozen fluid. The heating device is typically configured to initially thaw the fluid in immediate vicinity of the discharge fitting 6, especially in the area of the outlet, from where fluid is withdrawn from the fluid container 2 via the discharge fitting 6.

When withdrawing fluid from the fluid container 2, while frozen fluid has not, as of yet, been completely thawed, cavity 9 can form. The term "cavity" relates hereby to a hollow space or air void which is filled with air and/or gaseous fluid. As such, the cavity 9 represents an insulator between the liquid fluid 8 and the frozen fluid 10. Thus, liquid fluid 8 that has already been heated cannot, or only slightly, contribute to a thawing of the frozen fluid 10.

In accordance with the invention, the fill level determination device 5 is now being used to check the presence of the cavity 9 in the fluid, when withdrawing fluid from the fluid container 2. The cavity 9 is located, as shown by way of example in FIG. 1, below the fill level or actual fill level in the fluid container 2. When detecting during withdrawal of fluid an increase of the cavity 9, the heat output of the heating device is raised. Conversely, the detecting a decrease in size of the cavity 9, the heat output of the heating device is lowered. An energy-efficient operation of the heating device becomes thus possible because the heat output can be tailored to the situation at hand, i.e. frozen fluid 10 in the fluid container 2 can be melted and subsequently withdrawn. The heating device may hereby be configured with various sections that can individually be activated, i.e. a section of the heating device can be activated which is situated in the frozen fluid 10. Advantageously, the heat output of the heating device can be decreased in sections, or the heating device may even be fully deactivated in a region in which the cavity 9 is present. As a result, liquid fluid 8 is made available very efficiently through use of the heating device.

Figure 2:
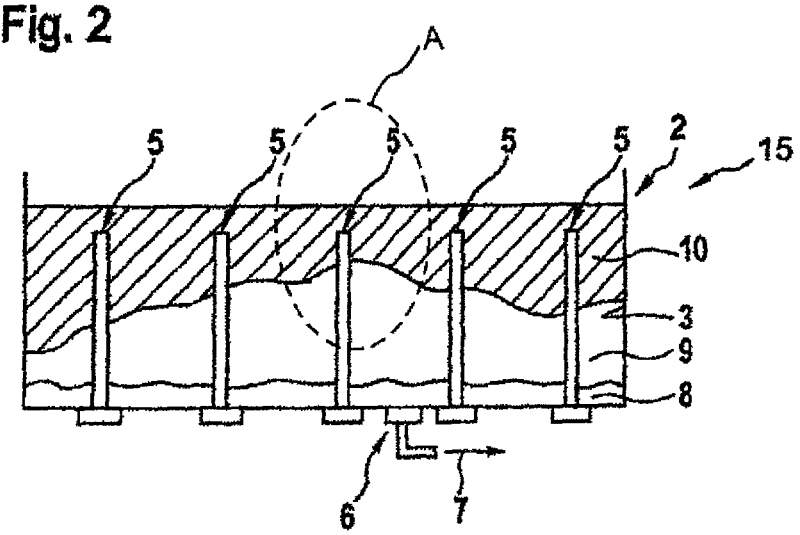
FIG. 2 is a sectional view of another embodiment of a fluid container arrangement according to the present invention.

FIG. 2 shows a sectional view of another embodiment of a fluid container arrangement according to the present invention, generally designated by reference numeral 15. Parts corresponding with those in FIG. 1 are denoted by identical reference numerals and not explained again. The description below will center on the differences between the embodiments. In this embodiment, provision is made for a plurality of fill level determination devices 5 which are arranged in spaced-apart relationship in the fluid container 2. Advantageously, the fill level determination devices 5 are evenly dispersed in the fluid container 2. The provision of the plurality of fill level determination devices 5 enables the determination of a profile of the cavity 9 on the basis of the dimensions of the fluid container 2.

Figure 2A:
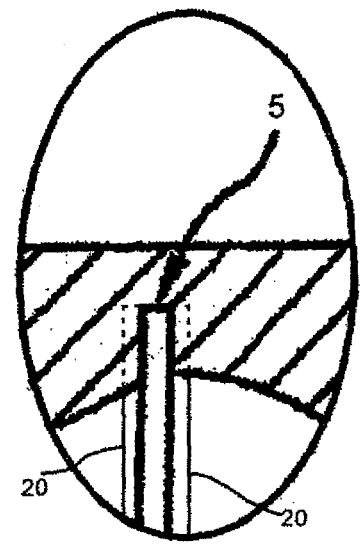
FIG. 2a is a detailed cutaway view of a fill level determination device taken along a circle marked A in FIG. 2.

Provision may be made for a separate heating device for each of the fill level determination devices 5, with the heating devices advantageously be arranged adjacent to the fill level determination devices 5, as shown by way of example in FIG. 2a indicating a heating device by reference numeral 20. Each of the fill level determination devices 5 can be used to activate the corresponding heating device in a manner as described above in connection with the fluid container arrangement 1 of FIG. 1. The provision of a plurality of fill level determination devices 5 is especially useful, when large fluid containers 2 are involved.

Figure 3:
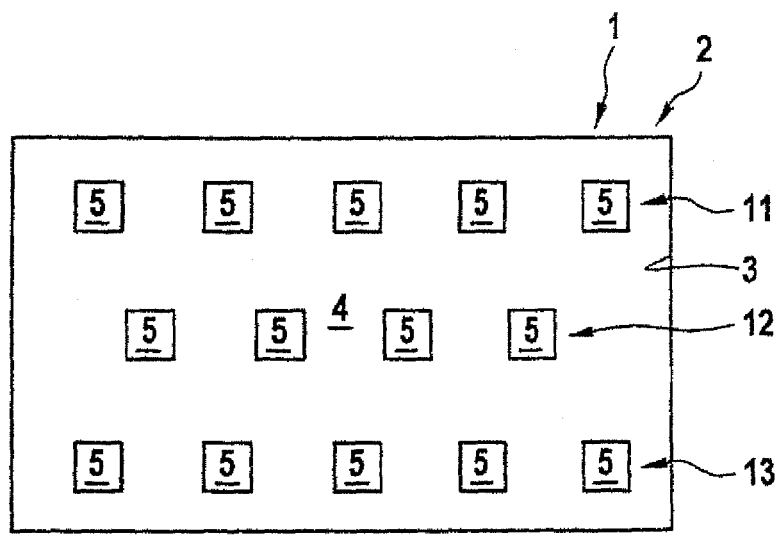
FIG. 3 is a schematic illustration of the fluid container arrangement of FIG. 2, depicting an exemplary distribution of fill level determination devices in a fluid container.

FIG. 3 shows a schematic illustration of the fluid container arrangement 15, depicting an exemplified arrangement of the fill level determination devices 5. As is readily apparent, the fill level determination devices 5 can be arranged in several, advantageously parallel, rows 11, 12, 13, with the fill level determination devices 5 in each of the rows 11, 12, 13 placed next to one another. The number of fill level determination devices 5 in each of the rows 11, 12, 13 may vary or be the same. While a disposition of the fill level determination devices 5 as shown in FIG. 3 is currently preferred, because analysis can easily be implemented and establishment of a profile of the cavity 9 becomes simple, it will be understood by persons skilled in the art, that the fill level determination devices 5 may, of course, also be randomly dispersed in the fluid container 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of operating a fluid container arrangement, comprising:
    checking, when desiring to withdraw fluid from the fluid container, for the presence of a cavity in a fluid contained in a fluid container by a fill level determination device configured for determining an actual fill level of the fluid in the fluid container, and, when the presence of the cavity is affirmative, detecting a change in volume of the cavity; and
    controlling a heat output of a heating device for heating the fluid container in response to the detected change in volume of the cavity.

2. The method of claim 1, wherein the heat output of the heating device is raised, when detecting that the volume of the cavity has increased.

3. The method of claim 1, wherein the heat output of the heating device is lowered, when detecting that the volume of the cavity has decreased.

4. The method of claim 1, wherein the fill level determination device operates capacitively.

5. The method of claim 1, further comprising ascertaining by a plurality of sensors of the fill level determination device a permittivity profile in the fluid container, and assigning by the permittivity profile permittivity values to subvolumes of the fluid container in one-to-one correspondence.

6. The method of claim 5, wherein the presence of frozen fluid in one of the subvolumes is detected, when the corresponding permittivity value exceeds a first threshold value.

7. The method of claim 5, wherein the presence of liquid fluid in one of the subvolumes is detected, when the corresponding permittivity value corresponds at the most to a first threshold value and exceeds a second threshold value.

8. The method of claim 7, wherein the presence of the cavity in one of the subvolumes is detected, when the corresponding permittivity value corresponds at the most to the second threshold value.

9. The method of claim 5, further comprising determining from the permittivity profile the actual fill level of the fluid container in response to a distance of an uppermost one of the subvolumes, in which the presence of fluid has been detected, from a bottom of the fluid container.

10. The method of claim 9, wherein the presence of an increase of the cavity is detected, when the actual fill level is constant and the permittivity value is decreased in one of the subvolumes which is below the uppermost subvolume.

11. The method of claim 5, further comprising activating a plurality of heating elements of the heating device as a function of the permittivity profile.

12. A fluid container arrangement, comprising:
a fluid container for receiving a fluid;
a fill level determination device configured to determine an actual fill level in the fluid container; and
a heating device for heating the fluid container,
said fill level determination device being configured such when desiring to withdraw fluid from the fluid container, the fill level determination device checks the presence of a cavity in the fluid, and a heat output of the heating device is controlled in response to a change in volume of the cavity.

13. The fluid container arrangement of claim 12, wherein the heat output of the heating device is raised, when the volume of the cavity has increased.

14. The fluid container arrangement of claim 12, wherein the heat output of the heating device is lowered, when the volume of the cavity has decreased.

15. The fluid container arrangement of claim 12, wherein the fill level determination device operates capacitively.

16. The fluid container arrangement of claim 12, wherein the fill level determination device includes a plurality of sensors to establish a permittivity profile in the fluid container, with the permittivity profile assigning permittivity values to subvolumes of the fluid container in one-to-one correspondence.

17. The fluid container arrangement of claim 16, wherein the fluid container has a bottom, with the permittivity profile determining the actual fill level of the fluid container in response to a distance of an uppermost one of the subvolumes, in which the presence of fluid has been detected, from the bottom of the fluid container.

18. The fluid container arrangement of claim 16, wherein the heating device includes a plurality of heating elements which are controlled as a function of the permittivity profile.

* * * * *